United States Patent [19]
Graves

[11] 3,965,440
[45] June 22, 1976

[54] TUNABLE LASER OSCILLATOR
[75] Inventor: Ross E. Graves, Pacific Palisades, Calif.
[73] Assignee: Hughes Aircraft Company, Culver City, Calif.
[22] Filed: Apr. 2, 1975
[21] Appl. No.: 564,569

[52] U.S. Cl. .................. 331/94.5 C; 331/94.5 S
[51] Int. Cl.² ..................................... H01S 3/10
[58] Field of Search ............................... 331/94.5

[56] References Cited
UNITED STATES PATENTS
3,586,997   6/1971   Kinsel ..................... 331/94.5 M
3,793,595   2/1974   Russo et al. .............. 331/94.5 S Primary Examiner—William L. Sikes
Attorney, Agent, or Firm—Don O. Dennison; W. H. MacAllister

[57] ABSTRACT

A laser oscillator circuit is disclosed which allows the operating frequency of the laser to be tuned over a wide range of frequencies in response to a wideband control signal. A laser oscillator such as that disclosed is useful in optical communications systems and especially in optical receivers utilizing a phase-locked control loop for tracking out frequency variations due to noise and the Doppler shifts.

8 Claims, 4 Drawing Figures

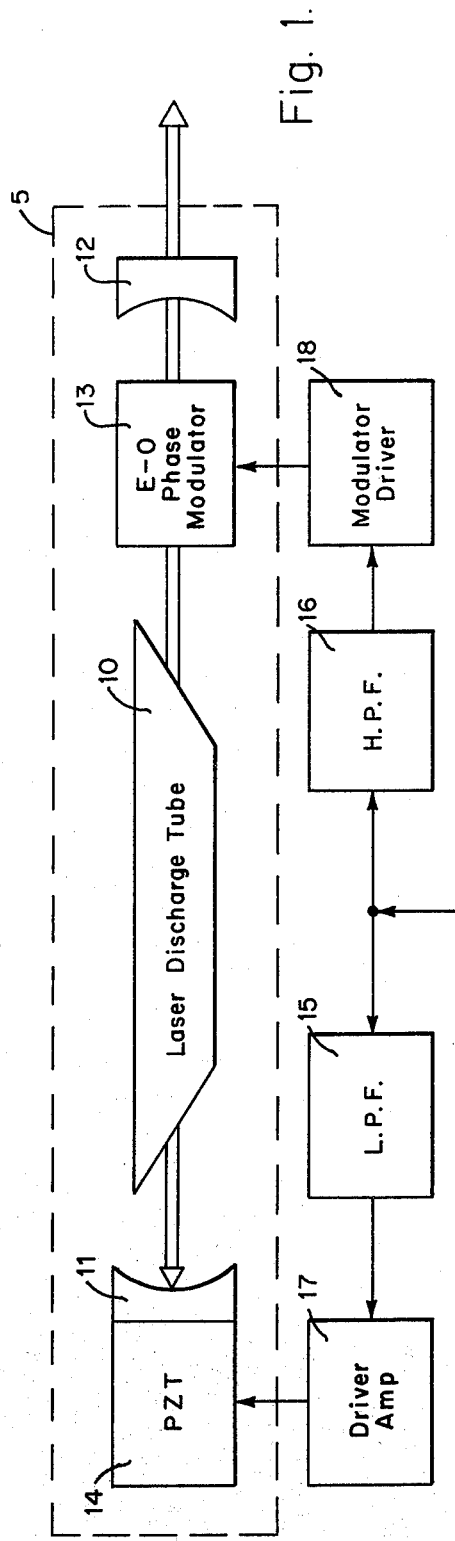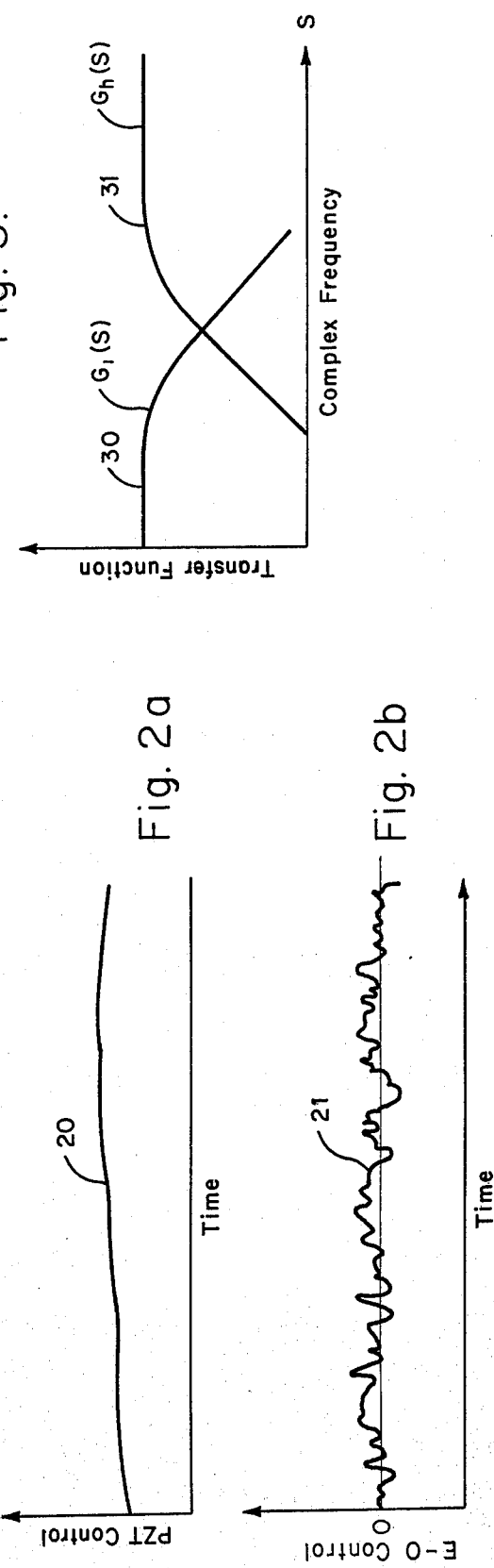

TUNABLE LASER OSCILLATOR

FIELD OF THE INVENTION

This invention relates to laser oscillators and more specifically to methods and apparatus for tuning laser oscillators over extended frequency ranges while simultaneously achieving wideband control signal response.

DESCRIPTION OF THE PRIOR ART

In many laser systems, and especially laser communications systems, it is often desirable to provide the capability of tuning a laser oscillator over a wide range of frequencies. For example, in optical receivers operating on the heterodyne or homodyne detection principle, it is frequently necessary to provide a laser local oscillator capable of being tuned over an extended frequency range. For example, in my copending application entitled "Phase Locked Optical Homodyne Receiver," Ser. No. 564,579, filed Apr. 2, 1975, now U.S. Pat. No. 3,939,341, issued Feb. 17, 1976, and assigned to the present assignee, there is described an improved homodyne receiver which makes use of a phase-locked loop including a tunable laser local oscillator for tracking Doppler shifted optical input signals.

In the past, wide-range frequency control has been achieved by physically varying the length of the laser cavity such as by means of a cavity mirror bonded to one side of a piezoelectric transducer (PZT). The PZT/mirror assembly is in turn driven by the control signal. This technique has enjoyed widespread use and is capable of providing relatively large changes in the operating frequency of the laser oscillator. Because of its mechanical nature and the inertial effects of the mass of the mirror, the frequency response of this technique is limited by the so-called "acoustic resonances" of the assembly. In other words, although large variations in the laser oscillator output frequency can be achieved utilizing this technique, the output frequency cannot be varied as rapidly as sometimes desired.

In applications requiring wideband frequency response, electro-optic phase modulators placed within the laser cavity have been employed. By driving the electro-optic phase modulator with the control signal, it is possible to control the phase shift of the wave energy within the cavity and hence the effective electrical length of the cavity. Since this technique has no mechanical inertia associated with it, wideband frequency response is possible. Presently available electro-optic phase modulators, however, suffer from the disadvantage of requiring relatively large driving power for moderate changes in the output frequency of the laser oscillator. This is especially true of cadmium telluride electro-optic crystals which are used with carbon dioxide laser oscillators.

Accordingly, it is a general object of the present invention to provide a laser oscillator which can be tuned over a wide range of operating frequencies in response to rapidly varying control signal.

It is another object of the present invention to provide a method for simultaneously achieving wide-range tuning and wideband response in a tunable laser oscillator.

SUMMARY OF THE INVENTION

In keeping with the principles of the present invention, the above objects are accomplished by providing at one end of the laser cavity a mirror mounted to an electro-mechanical transducer such as a piezoelectric crystal, and within the laser cavity, an electro-optic phase modulator. The piezoelectric transducer (PZT) provides gross changes in the laser oscillator frequency in response to the relatively low-frequency components of the control signal. The electro-optic phase modulator, on the other hand, provides oscillator tuning for the very rapidly changing high frequency components of the control signal. A combination of filter networks and amplifiers is utilized to separate the low- and high-frequency components of the control signal and apply them at the required levels to the piezoelectric transducer and the electro-optic phase modulator, respectively.

The invention, therefore, is useful in optical receivers requiring phase-locked operation of a laser local oscillator. The control signal typically contains Doppler components and noise components. The Doppler components of the control signal typically change slowly but over a wide range. The noise components of the control signal, on the other hand, are usually characterized by relatively minor excursions but at a much more rapid rate.

BRIEF DESCRIPTION OF THE DRAWINGS

In order that the invention may be clearly understood and readily carried into effect, it will now be described with reference by way of example to the accompanying drawing in which:

FIG. 1 is a block diagram of the preferred embodiment of the present invention;

FIGS. 2A and 2B are graphical representations of typical waveforms for the drive input to the piezoelectric transducer and the electro-optic phase modulator of FIG. 1, respectively; and FIG. 3 is a graphical representation of exemplary transfer functions of the frequency-determining elements of the embodiment of FIG. 1.

DESCRIPTION OF THE PREFERRED EMBODIMENT

Referring more specifically to the drawings, there is shown in FIG. 1 a block diagram of a tunable laser oscillator according to the present invention. A laser discharge tube 10 is disposed and optically aligned with a pair of mirrors 11 and 12 defining the ends of a resonant optical cavity. As is commonly the practice, mirror 12 is partially transmissive to facilitate the coupling of optical wave energy out of the cavity. Disposed within the optical cavity between laser discharge tube 10 and partially transmissive mirror 12 is an electro-optic (E. O.) phase modulator 13. Alternatively, electro-optic phase modulator 13 can be disposed within the optical cavity between mirror 11 and laser discharge tube 10, if desired. Mirror 11 is securely bonded to an electro-mechanical transducer such as piezoelectric transducer (PZT) 14.

Because of the many advantages enjoyed by carbon dioxide ($CO_2$) lasers in modern optical communications systems, the invention will be advantageously described with reference to this active laser medium. It is understood, however, that this is merely exemplary and that other lasers using other active laser media may be employed with suitable changes in the associated components. In any event, laser discharge tube 10 is provided with suitable pumping means, not shown, for creating a population inversion within the energy level system of the $CO_2$ to sustain laser action. Broken line rectangle 5 shown in the embodiment of FIG. 1, represents a rigid mounting frame in which the piezoelectric transducer, the laser discharge tube, the electro-optic phase modulator and the mirrors are mounted and maintained in optical alignment.

A control signal input derived from source 19 for controlling the operating frequency of the laser oscillator is provided. The control signal input is applied simultaneously to a lowpass filter 15 and a highpass filter (H.P.F.) 16. The output of lowpass filter (L.P.F.) 15 is in turn coupled through a driver amplifier 17 to the input of piezoelectric transducer 14. In a similar manner the output of highpass filter 16 is coupled through a modultor driver 18 to the input of electro-optic phase modulator 13.

In considering the operation of the embodiment of FIG. 1, it is first assumed that the control signal input is zero. In this situation, the laser oscillator comprising laser discharge tube 10 and the laser cavity defined by end mirrors 11 and 12 oscillates at a frequency determined primarily by the length of the laser cavity. With no control signal present, electro-optic phase modulator 13 serves to alter the effective length of the cavity but only by a fixed easily determinable amount. If now it is assumed that a control signal input having relatively low frequency components is applied to the input terminal of the embodiment of FIG. 1, this low frequency control signal is passed through lowpass filter 15 to driver amplifier 17 where it is amplified and coupled to PZT 14 causing end mirror 11 to move in or out depending on the sense of the control voltage. A typical waveform of the PZT drive voltage is shown by curve 20 in FIG. 2A. With an alternating control voltage, of course, mirror 11 oscillates about its resting position thereby shortening and lengthening the internal dimensions of the laser cavity in response to the control voltage variations. As is well known, the frequency change produced by a change in the cavity length $\Delta L$ is given by the expression: $\Delta f = -(\Delta L)c/\lambda L$, where $c$ is the propagation velocity, $L$ is the cavity length and $\lambda$ is the wavelength.

In a typical laser oscillator of the carbon dioxide variety operating at a nominal wavelength of 10.6 microns, a cavity length of 50 centimeters is assumed. In such a laser oscillator, a 1 micron change in the position of mirror 11 will produce a frequency change of about 60 megahertz. If used in the local oscillator circuit of a phase-locked optical receiver, it is not unreasonable to expect a range of Doppler shifted input signals approaching ±700 megahertz. In any event, the low frequency component of the control voltage input is utilized to produce the gross variations in the laser oscillator operating frequency to correct for such shifts.

Assume now that the control signal input to the embodiment of FIG. 1 contains high frequency components such as those produced by random noise. These high frequency components of the control signal input are coupled through highpass filter 16 to the input of modulator driver 18. The output of modulator driver 18 is in turn coupled to the input of the electro-optic phase modulator 13. (A graphical representation of the drive signal to electro-optic phase modulator 13 is shown as curve 21 in FIG. 2B.)

The function of the electro-optic phase modulator 13 is to provide an electronic means of varying the effective length of the laser cavity. Due to its lack of mechanical structure and the corresponding inertial effects, electro-optic phase modulator 13 is of much wider bandwidth. As is well known, a phase shift $\Delta\phi$ produces a laser frequency shift given by the expression: $\Delta f = -(\Delta\phi)c/2\pi L$; where $c$ and $L$ have the same meanings as in the previous expression. Taking the exemplary laser oscillator having a cavity length of 50 centimeters, a phase shift of 0.01 radians produces a frequency shift on the order of 1 megahertz. A phase shift in practical electro-optic phase modulators fabricated of cadmium telluride on the order of 0.01 radians is practical with relatively modest drive power.

In practice, the control signal input from source 19 of FIG. 1 comprises both low frequency and high frequency components. The function of the lowpass filter and highpass filter is to separate those components in order to provide drive to the appropriate frequency determining element. In selecting the appropriate characertistics for the lowpass and highpass filters, it is necessary to consider also the frequency response characteristics of the associated driver amplifier, modulator driver, piezoelectric transducer and electro-optic phase modulator. In the graphical representation of FIG. 3, there is shown the typical transfer functions of the components of a complete oscillator control system in which the over-all transfer function is substantially unity. The transfer function of the lowpass filter 15, driver amplifier 17, and piezoelectric transducer 14 is depicted by curve 30. The transfer function of highpass filter 16, modulator driver 18, and electro-optic phase modulator 13 is depicted by curve 31. For a transfer function of unity, the individual transfer functions are such that $G_1(s) + G_n(s) = 1$. In general, it is desirable that the transfer function $G_1(s)$ of curve 30 taper down to a value which is very small at the so-called "acoustic resonance" of the piezoelectric transducer 14. In a typical embodiment, this might correspond to a frequency on the order of 4 kilohertz. In general, lowpass filter 15 and highpass filter 16 can be realized by relatively simple resistance-capacitance networks.

Driver amplifier 17 and modulator driver 18 can be realized by straightforward transistor amplifier circuits having the appropriate power handling capabilities and response characteristics for matching PZT 14 and electro-optic phase modulator 13, respectively.

In all cases it is understood that the above-described embodiment is illustrative of but one of the many possible specific embodiments which can represent applications of the principles of the present invention. Numerous and varied other arrangements can be readily devised in accordance with these principles by those skilled in the art without departing from the spirit and scope of the invention.

What is claimed is:

1. In combination:
    a laser oscillator having a pair of end reflecting members defining a resonant laser cavity and a laser medium disposed within said cavity;
    means for providing a control signal for controlling the frequency of said laser oscillator;
    electro-mechanical means disposed at one end of said cavity for varying the length of said laser cavity substantially in response to components of said control signal below a first frequency;
    electro-optical means disposed within said cavity for varying the effective electrical length of said laser cavity substantially in response to components of said control signal above said given frequency;

first means for coupling a first component of said control signal to said electro-mechanical means; and second means for coupling a second component of said control signal to said electro-optical means.

2. The combination according to claim 1 wherein said electro-mechanical means includes a piezoelectric transducer bonded to one of the end reflecting members.

3. The combination according to claim 1 wherein said electro-optic means includes an electro-optic phase modulator.

4. The combination according to claim 3 wherein said electro-optic phase modulator comprises a crystal of cadmium telluride.

5. The combination according to claim 1 wherein said first means includes a lowpass filter.

6. The combination according to claim 1 wherein said second means includes a highpass filter.

7. The combination according to claim 1 wherein said first means comprises the serial combination of a lowpass filter and an amplifier and said second means comprises the serial combination of a highpass filter and an amplifier.

8. A method for controlling the frequency of a laser oscillator having an active laser medium disposed within a resonant optical cavity defined by a pair of reflecting end members in response to a wideband control signal, comprising the ordered steps of:

separating said wideband control signal into a low frequency component and a high frequency component;

utilizing said low frequency component to drive an electro-mechanical transducer mounted to one of said reflecting end members to vary the physical length of said cavity; and utilizing said high frequency component to drive an electro-optic phase modulator disposed within said cavity to vary the effective electrical length of said cavity.

* * * * *